US007502758B2

(12) United States Patent
Burke

(10) Patent No.: US 7,502,758 B2
(45) Date of Patent: Mar. 10, 2009

(54) CREATION AND DISTRIBUTION OF EXCESS FUNDS, DEPOSITS, AND PAYMENTS

(75) Inventor: Bertram V. Burke, Sea Bright, NJ (US)

(73) Assignee: Every Penny Counts, Inc., Sarasota, FL (US)

( * ) Notice: Subject to any disclaimer, the term of this patent is extended or adjusted under 35 U.S.C. 154(b) by 607 days.

(21) Appl. No.: 10/380,247

(22) PCT Filed: Sep. 12, 2001

(86) PCT No.: PCT/US01/28345

§ 371 (c)(1),
(2), (4) Date: Dec. 15, 2003

(87) PCT Pub. No.: WO03/030054

PCT Pub. Date: Apr. 10, 2003

(65) Prior Publication Data

US 2004/0153400 A1 Aug. 5, 2004

(51) Int. Cl.
*G06Q 40/00* (2006.01)
(52) U.S. Cl. .......................................... 705/39; 705/35
(58) Field of Classification Search .................... 705/39, 705/40, 41
See application file for complete search history.

(56) References Cited

U.S. PATENT DOCUMENTS 5,010,485 A     4/1991  Bigari
5,466,919 A    11/1995  Hovakimian
6,052,674 A     4/2000  Zervides et al.
6,112,191 A *   8/2000  Burke ........................... 705/41
2006/0212393 A1*  9/2006  Lindsay Brown ............ 705/40

OTHER PUBLICATIONS

"Marriott Offering 'All-in-One-Card' to Colleges, Providing Access to Dining Facilities and Vendors," Vending Times, p. 5, Apr. 1990.
R. Vanderhoof et al., "All for One; One for All," AS&U, pp. 46-47, Oct. 1991.
K. Gullo, "Firm to Offer Prepaid Card Aimed at College Students," American Banker, vol. 155, No. 200, p. 3, Oct. 15, 1990.
"Multi-Purpose ID Cards Being Tested at Universities Around Nation," EFT Report, vol. 15, No. 25, Dec. 9, 1992.

(Continued)

*Primary Examiner*—Ella Colbert
*Assistant Examiner*—Samica L Norman
(74) *Attorney, Agent, or Firm*—Christopher & Weisberg, PA

(57) ABSTRACT

Accumulating credits from financial movements to and from accounts held by a financial transactor and managed by an account manager involves initiating a roundup by periodically accessing entries in the account with an information processor to round up entries in the account, rounding up the entries in the account to obtain a total roundup amount, withdrawing the roundup amount from the account and debiting the account with the roundup amount. In one embodiment the information processor is external to and out of control of the account manager. At non-bank and bank locations send deposits and payments, in cash and/or checks, to financial institutions by using a remote input to truncate the paper checks and the cash used in the transaction.

12 Claims, 10 Drawing Sheets

OTHER PUBLICATIONS

"Virginia University Offers Debit Card to Expand Services," EFT Report, vol. 15, No. 20, Sep. 30, 1992.

"All in One: Prepaid Debit Cards Continue to Gain Ground," CardFAX, Sep. 21, 1992.

"Campus Prepaid Cards Experiencing Both Growth and Growing Pains," Card News, vol. 6, No. 9, p. 4, May 6, 1991.

"Florida State University's Prepaid/Debit Card Piques Industry's Interest," EFT Report, vol. 14, No. 12, Jun. 10, 1991.

"Maryland's Collegecard Promoted as Secure, Low-Value Payment Medium," EFT Report, vol. 13, No. 15, Jul. 23, 1990.

"Cards in Differing Applications Serving Variety of College Needs," Card News, vol. 5, No. 7, Apr. 9, 1990.

"Prepaid University Transaction Card Slated as Discount Device for Students," EFT Report, vol. 13, No. 5, Mar. 5, 1990.

Y. Miyahara et al., "Campus Card System with IC Card," OKI Technical Review, vol. 57, No. 138, pp. 31-34, Jun. 1991.

* cited by examiner

CREATION AND DISTRIBUTION OF EXCESS FUNDS, DEPOSITS, AND PAYMENTS

FIELD OF THE INVENTION

This invention relates to the creation and distribution of excess funds arising from transactions between parties and the creation and distribution of deposits and payments from cardholders to financial institutions.

BACKGROUND OF THE INVENTION

In regard to the creation of excess funds, U.S. Pat. No. 6,112,191 is incorporated herein by reference. This patent discloses creating excess funds by rounding up the amounts involved in financial transactions. Such transactions may for example include checking account deposits, check and ATM withdrawals, and credit, debit, or smart card drafts. To create the excess funds, the customer instructs the bank that manages the customer's account to perform the rounding services. The funds are distributed to recipients determined by the customer. This requires the bank to offer and perform the service and thus limits the customer when such services are unavailable.

In regard to the creation and distribution of deposits and payments to financial institutions, account holder can currently make deposits or payments to their accounts held by a financial institution using mail, a bank teller, an ATM, their employer making a direct payroll deposit, or by account transfer from another financial institutions.

An object of the invention is to improve such methods and systems.

SUMMARY OF EMBODIMENTS OF THE INVENTION

An embodiment of the invention involves accumulating credits from financial movements to and from accounts belonging to a financial transactor and managed by an account manager, by periodically accessing entries in the account with an information processor that is authorized by the transactor to access the entries, rounding up the entries in the account to obtain a total roundup amount, and withdrawing and debiting the roundup amount from the account. In an embodiment the processor is external to out of control of the account manager. The term "transactor" has been constructed to define any party to a transaction.

Another embodiment of the invention involves the account holder using a remote input to make a deposit or payment to a financial institution. Said remote input (1) records and forwards account information on account holders who are making deposits and payments, (2) records and forwards information and funds from the business or personal accounts used by forwarding agents to transfer cash to the designated financial institutions, (3) has the internal or connected capability of accepting, storing, and counting, bills and coins designated for deposit, (4) records and forwards information to financial networks corresponding to the amount of cash and checks being deposited, (5) has scanning and imaging capability to create and forward digital images of both sides of paper checks used for deposit or payment to networks operated by financial institutions, (6) accepts acknowledgement back from the financial networks that the information forwarded, has been properly stored, and (7) based upon instructions from the financial networks, the remote input will then stamp cancel or shred the physical checks used in the payment or deposit. Said remote unit will also have a communication system within the remote input unit to bi-directionally communicate with networks operated by financial institutions.

Lastly, another embodiment, the invention involves the account holder using a remote input to make check and cash deposits and payments to a financial institution. In making deposits or payments, said remote input performs the following functions; (1) records and forwards account information on account holders who are making deposits and payments, (2) has the internal or connected capability of accepting, storing, and counting, bills and coins designated for deposit, (3) records and forwards information to financial networks corresponding to the amount of cash and checks being deposited, (4) has scanning and imaging capability to create and forward digital images of both sides of paper checks used for deposit or payment to networks operated by financial institutions, (5) accepts acknowledgement back from the financial networks to the remote input that the information forwarded, has been properly stored, and (6) based upon instructions from the financial networks, the remote input will then stamp cancel or shred the physical checks used in the payment or deposit. Said remote unit will also have a communication system within the remote input unit to bi-directionally communicate with networks operated by financial institutions.

The various features of novelty that characterize the invention are pointed out in the claims. Other objects and advantages of the invention will become evident from the following detailed description when read in light of the following drawings.

DETAILED DESCRIPTION OF PREFERRED EMBODIMENTS

Figure 1:
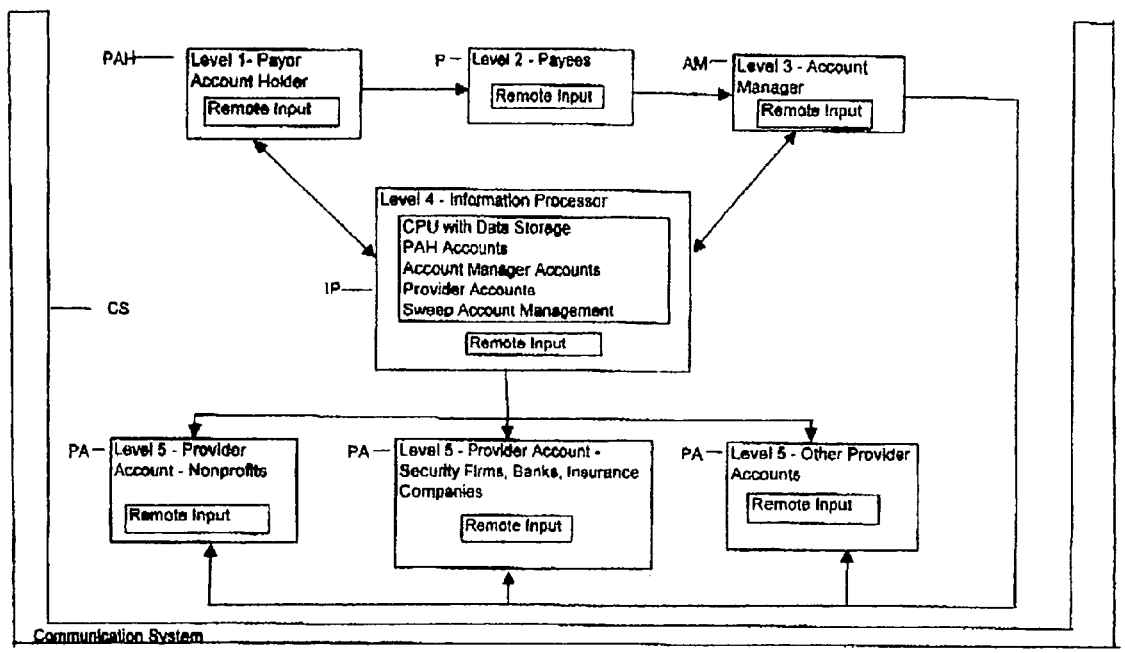
FIG. 1 is a block diagram of the rounder system embodying features of the invention.

In FIG. 1, an embodiment of the invention includes a five level system. The first level involves a Payer Account Holder PAH, who may be any type of financial transactor such as a person, institution, governmental entity, trust, corporation, or a customer, and who may hold one or more accounts of any kind such as a checking, credit, debit, home equity, or smart card accounts. The second level involves a Payee P who accepts payments from the Payer Account Holder PAH. The third level involves an Account Manager AM who issues the accounts and manages it for the Payer Account Holder PAH; a bank or credit card issuing company are examples, but the term is not limited thereto. At the fourth level is an Information Processor IP that performs rounding of accounts to create the excess funds and distribution of the excess funds. That is, it accepts and rounding information from the Payer Account Holder PAH to create the excess funds and accepts distribution information to distribute the excess funds. The fifth level involves one or more Provider Accounts PA selected by the Payer Account Holder PAH to receive distribution of the excess funds. The Provider Account may be in a non-profit institution, a security firm, a bank, an insurance company or any other entity. A Provider Account PA may be owned by the Payer Account Holder PAH.

According to an embodiment, the Information Processor IP is external to and outside the control of the Account Manager AM. In an embodiment it is also out of control of the Payee. In one embodiment, the Processor IP is for example an organization that performs the rounding and distribution function for a number of Payer Account Holders PAH. In another embodiment it is a computer belonging the Payer Account Holder PAH and containing a module to execute the actions of the Information Processor IP.

According to yet another embodiment the Account Manager AM receives data from the Information Processor IP to perform the rounding, debiting, withdrawal, and crediting functions of the Information Processor IP on a periodic basis.

The Payer Account Holder PAH, the Payee P, the Account Manager MA, the Information Processor IP, and the Provider Accounts PA each includes a Remote Input RI which allows each to communicate on-line.

A communications system (CS) allows the various levels within the system to communicate with each other. The communication system may include any communication arrangement such as telephone lines, satellites, or cables.

In FIG. 1, Level 1, is a Payer Account Holder PAH who uses a Remote Input (RI), a device with connecting software, that allows the Payer Account Holder PAH to communicate online or off line with Levels 2, 3, 4, and/or 5.

According to an embodiment, the Payer Account Holder PAH first makes a traditional payment transaction to a Payee P at Level 2 in-person, online, or off line using a check, ATM, credit, debit, or smart card transaction, automatic debit using a check, money wire, wireless transfer, or any other form of deposit or withdrawal against the balance of his/her/its demand deposit account, debit or smart card account or against the balance of his/her/its assigned credit line.

In addition, the Payer Account Holder PAH at Level 1 also uses the Remote Input RI to enter Account Instructions AI listing his/her/its account(s) (checking, debit, credit, smart card accounts, etc.), the Account Manager AM(s) (bank((s), card issuer(s), retail merchant(s) who issue credit, etc.), his/her/its password(s), user name(s), PINs (Personal Identification Numbers), the specific rounder amount or determinant (a percentage of the face amount, dollar amount, etc. applied to the face amount of the transaction or the number of transactions), the Provider Account(s) selected by the Payer Account Holder PAH, and the amount of funds sent to each PA.

In FIG. 1, Level 2, the Payee (P) can be any third party or the Payer Account Holder PAH himself, herself, or itself. If the payment is not a cash withdrawal, the payee will cash in the draft with another third party or deposit the draft into a financial institution.

According to one embodiment the third party Payee P is made unaware from knowing the Payer Account Holder's PAH intention to round up nor the Provider Accounts PA the Payer Account Holder PAH selects to receive the rounded funds. In another embodiment where the Payer Account Holder PAH and the Payee P are the same, the Payee is aware.

At Level 2 there is a Remote Input RI that allows the Payee P to communicate online or off line with Levels 1 or 3.

In FIG. 1, Level 3, the traditional draft will then arrive at the Account Manager (AM) for customary authorization, approval, and payment. Upon completing the transaction, the Account Manager AM will update the cash balances in the demand deposit, debit or smart card and the allowable credit balances in the credit card account.

In Level 3, the Account Manager AM keeps a Transaction File (TF), which is an account statement showing the individual Payer Account Holder PAH checking or credit, debit, or smart card transactions and balances for a specified period of time. Also at Level 3 there is a Remote Input RI, a hardware device with connecting software, that allows the Account Manager AM to communicate online or off line to Levels 1, 4, and/or 5. Once Level 3 receives a Debit Transaction (DT) for the Total Rounder Amount (TRA), it will update the balances to each account.

In FIG. 1, Level 4, an Information Processor (IP) or its equivalent has a Remote Input RI that allows the Information Processor IP to go online or off line to Levels 1, 3, and/or 5.

At Level 4, the Information Processor IP performs a variety of functions such as:

(1) Allowing the Payer Account Holder PAH in Level 1 to enter Account Instructions AI. These include giving the Information Processor authority to access the Payer Account Holder's (PAH) account or accounts in the Account Manager AM, and to debit the excess from the accounts in the amounts determined by the rounding process.

(2) Asking the Payer Account Holder PAH's Account Instructions AI the Information Processor IP retrieves or receives (through any one of several methods such as OFX/IFX or a standard or customized download process) a transaction file from Level 3 with or without the knowledge or cooperation of Level 3, (3) Within Level 4 the Information Processor IP computes the determinant stored in Account Instructions AI to the face amount of each transaction or the number of transactions and totals the amount of created excess funds or the Total Rounder Amount (TRA), and (4) The Information Processor IP sends a Debit Transaction (DT) equal to the Total Rounder Amount TRA to the Account Manager AM in Level 3.

In FIG. 1, Level 5, the Provider Accounts PA) include security firms, banks, nonprofit organizations, insurance companies, and other service providers who have or have not registered with the Information Processor IP.

In the preferred embodiment of an Information Processor IP, the Payer Account Holder PAH can select or register one or more Provider Accounts PA to receive the rounded funds.

As an alternate embodiment, the Payer Account Holder PAH may authorize a PA to request a funds transfer from Level 4, the Information Processor IP.

At Level 5 a Remote Input RI allows the Provider Account PA to connect online or off line to Levels 1, 3, and/or 4.

As further clarification of the above functions:

As used, a Financial Transaction is any transaction including, but not limited to, an exchange, value transfer, a check, ATM withdrawal, credit, debit, or smart card draft, a money order, a person to person payment, ACH transaction, wire transfer or any other financial transaction that can occur between a Payer and a payee a consumer, retail, business, government, or institutional context.

The Account Instructions AI represent the inputs stored in the Information Processor IP from the Payer Account Holder PAH. The Account Instructions AI contains ID information, the accounts and the Account Manager AM(s), the rounder amounts, the Provider Account(s), etc.

The Transaction File (TF) is the number of individual Payer Account Holder PAH checking or credit/debit/smart card transactions and balances for a specified period. The Information Processor IP at Level 4 retrieves or receives the Transaction File TF from Level 3, the Account Manager AM.

The Face or Entry Amount (FA) means the actual amount of the check/ATM withdrawal or credit/debit/smart card charges prior to any rounder activity.

The Transaction Count (TC) is the number of transactions recorded in the account prior to any rounder activity.

The Coin Amount (CA) is the presence of coins in the face amount, i.e. check for $10.14, Coin Amount CA equals $0.14.

The Rounder Amount (RA) equals the amount of excess funds produced as a result of the application of the Rounder Function (RF) to each individual transaction in the Transaction File TF. Alternately, this can represent the total amount of excess funds produced by the application of the RF to all transactions in the Transaction File TF.

The Rounder Function (RF) is the numerical function used to derive the Rounder Amount RA. The function utilizes information stored in the Account Instructions AI and applies the function against the transactions in the Transaction File TF. The Rounder Amount RA is produced by the Information Processor IP applying the Rounder Function RF, for example, $10.14 using a $1.00 rounder will produce $0.86 as the rounded amount of excess funds. Parameters for the Rounder Function RF are stored in the Account Instructions AI. This information is then applied against the face amount of the entry itself, i.e., $1.00, $3.00, 2%, or a specific number, such as $1.50 to create excess funds. In the preferred embodiment this will be a whole dollar amount such as $1.00, $5.00, $10.00, etc. added to the entry. This function will either utilize an algorithm to round the face amount of each transaction or apply a multiplier to the transaction count.

In practice a Payer Account Holder PAH could have multiple accounts, (example, his/her/its checking and credit card account), being rounded up by an Information Processor IP. In such situations the Payer Account Holder PAH could have a different Rounder Function assigned to each account.

The Total Rounder Amount (TRA) is the amount of excess funds produced in the Information Processor IP from all Rounder Amounts to the total of the Transaction Count TC multiplied by a multiplier as defined in the Account Instructions AI.

The Provider Accounts (PA) are the accounts from Level 5 listed in the Information Processor IP.

The Debit Transactions (DT) are created by the Information Processor IP and applied against the customer's financial account managed by the Account Manager AM.

The Sweep Account (SA), if needed, will accept and hold rounded funds until they are forwarded to Account Provider(s). Under most circumstances the Provider Account(s) will accept funds on a monthly basis. Under selected conditions, Provider Account(s) may require a minimum amount, i.e. $100.00, before they will accept the funds in an EFT transfer. The Information Processor will manage the Sweep Account until the funds reach the required critical mass.

Once configured, the Information Processor IP sends the Debit Transactions DT to the Account Manager AM in the form of an automatic check withdrawal (an ACH Automatic Clearing House), a merchant credit card draft sent through traditional processor channels, a check via U.S. Post Office mail, smart card transactions through a point of sale terminal, a wireless payment through a processor service, or any other debiting method. Depending upon the Payer Account Holder PAH instructions there can be one or more Debit Transactions DT sent to any Account Manager AM.

The Debit Transactions DT sent to the Account Manager AM indicates the amount of the debit and to where the funds should be sent.

The Remote Input (RI) located in all five levels can be a point of sale terminal, draft capture terminal, smart card terminal, a personal computer, wireless device, personal digital assistant (PDA), an Internet device, fax machine, or any other computer based unit that has the capabilities of communicating data to other computers.

The Rounder Module (RM) is a software program that contains all of the calculating, downloading, uploading, and storage features used in the Information Processor IP and capable of being operated out of Levels 1 and 5.

Figure 2:
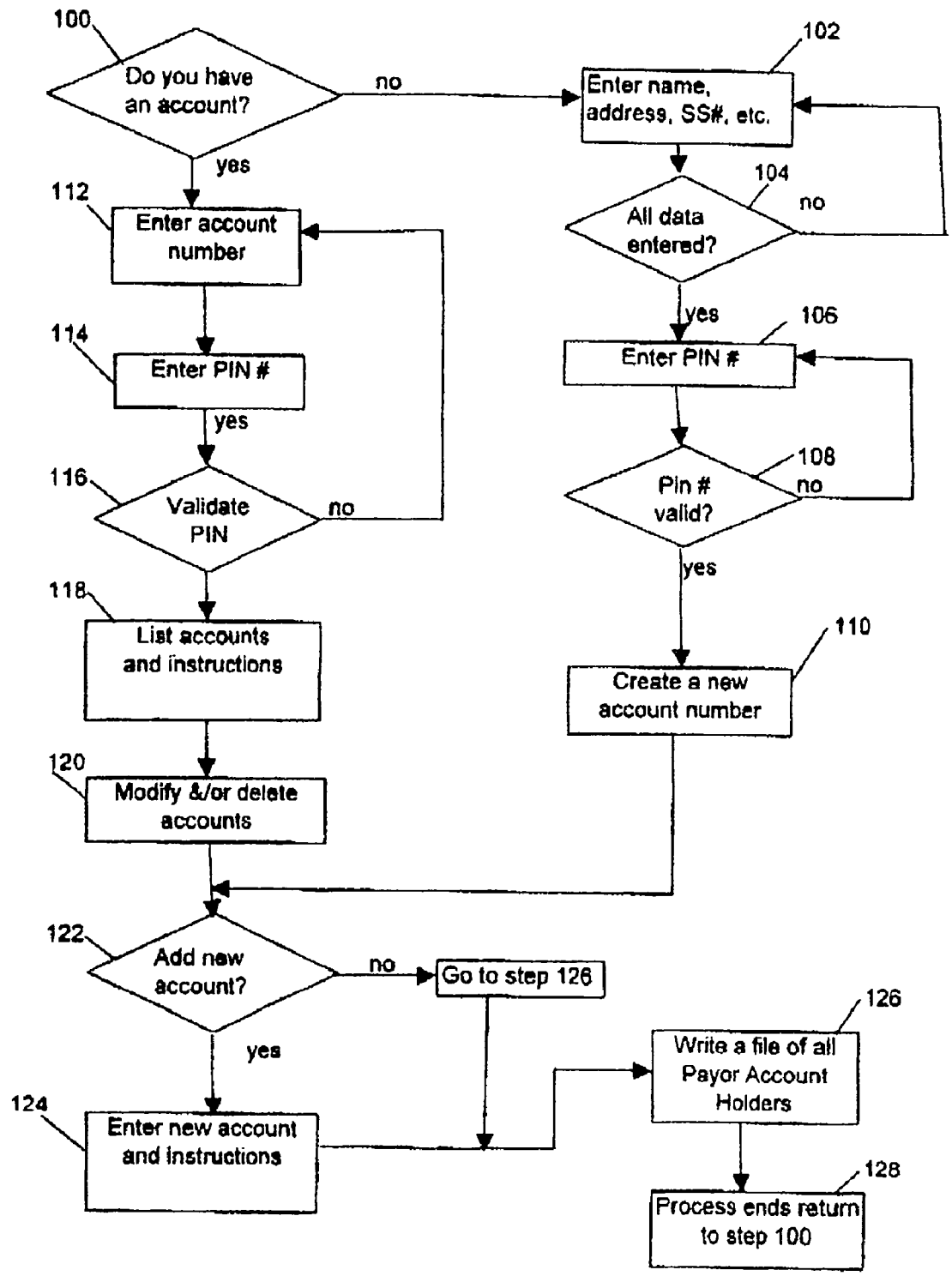
FIG. 2 is a flow chart of the steps that take place to enroll subscribers in the rounder system shown in FIG. 1.

In FIG. 2, a flow chart illustrates the steps, which a Payer Account Holder PAH takes, through a Remote Input RI to open or revise a rounder account with the Information Processor IP. After the Payer Account Holder PAH enters the Account Instructions AI, the Information Processor IP executes the Payer Account Holder PAH instructions and creates a Debit Transaction (DT). The Account instructions include the identification of the Payer Account Holder PAH accounts in the Account Manager AM and the coded authorizations to access and withdraw from the Payer Account Holder PAH accounts in the Account Manager AM. The Debit Transactions DT is transmitted to Level 3 the Account Manager AM with payment instructions to distribute the excess funds to the selected Provider Accounts or to Level 4 the Information Processor IP whereupon the funds will be forwarded to the selected recipients.

In step 100 the Information Processor IP asks the customer if you have a rounder account.

If the response is no, in step 102 the Information Processor IP asks the customer to enter his or her name, a user name, an address, a social security number, and select a pin number and/or a password, as well as any other vital information needed to open a rounder account.

In step 104 the Information Processor IP determines if all the needed information has been entered. If not, it returns to step 102 to ask again for the desired information.

If the response is yes, the Information Processor IP proceeds to step 106 to input the customer's PIN number or code name. In step 108 the Information Processor IP determines if the PIN number is acceptable. If not, it returns to step 106 for another number.

If the response is yes, the Information Processor IP advances to step 110 to assign a rounder account number. The computer then goes to step 122 to create new accounts.

If the answer in step 100 is yes, that the customer is already a subscriber, the Information Processor IP proceeds to step 112 to have the subscriber enter his/her/its rounder account number. In step 114 it asks the subscriber to enter his or her pre-selected PIN number. In step 116 it determines whether the entered PIN number matches the pre-selected PIN number for the subscriber number entered. If not, it returns to step 112 to correct the subscriber number and/or PIN number. The Information Processor IP allows this procedure between steps 112 and 116 to recur only three times, thereafter it aborts the program.

If the PIN number is correct and thereby qualified, the Information Processor IP in step 118 lists (1) the rounder number or percentage that is applied to each account entry or the total number of account entries (e.g. $1, $3, 2%), (2) stop orders (when to stop processing rounder transactions), (3) the type of account(s) (e.g. checking, credit, debit, and/or smart card account), (4) the transactions for processing (e.g. withdrawals, deposits, fees, payments, interest income, etc.), (5) the names and addresses of the Provider Account(s) and any apportionment instructions, and (6) the code access numbers (e.g. PIN numbers) that permit the Information Processor IP to access accounts in the Account Manager AM.

In step 120 the Information Processor IP allows the account holder to eliminate or modify any accounts and to modify the access codes to the accounts.

In step 122 the Information Processor IP asks the subscriber if there are any new accounts to add.

If the answer is no, the computer goes to step 126 to write an updated rounder account file.

If the response is yes, the Information Processor IP then proceeds to step 124, and asks the subscriber to enter any new accounts and instructions according to: (1) the rounder number or percentage that is applied to each account entry or the total number of account entries ($1, $3, 2%, etc.), (2) stop orders (when to stop processing rounder transactions), (3) the type of account(s) (checking, credit, debit, and/or smart card account), (4) the transactions for processing (withdrawals, deposits, fees, payments, interest income, etc.), and (5) the recipients (PA(s)) name, account IDs, and any apportionment instructions. It also asks for the access codes that authorize access and withdrawal from the accounts.

In step 126 the computer writes a file, called the rounder account file, containing the new or revised subscriber's identification information and account instructions including authorizations. When the Information Processor IP at Level 4, requires Account Information (AI) to perform rounder calculating for individual Payer Account Holder PAHs, it will go to step 126 for the needed instructions.

In step 128 the process ends and the computer returns to step 100.

Figure 3:
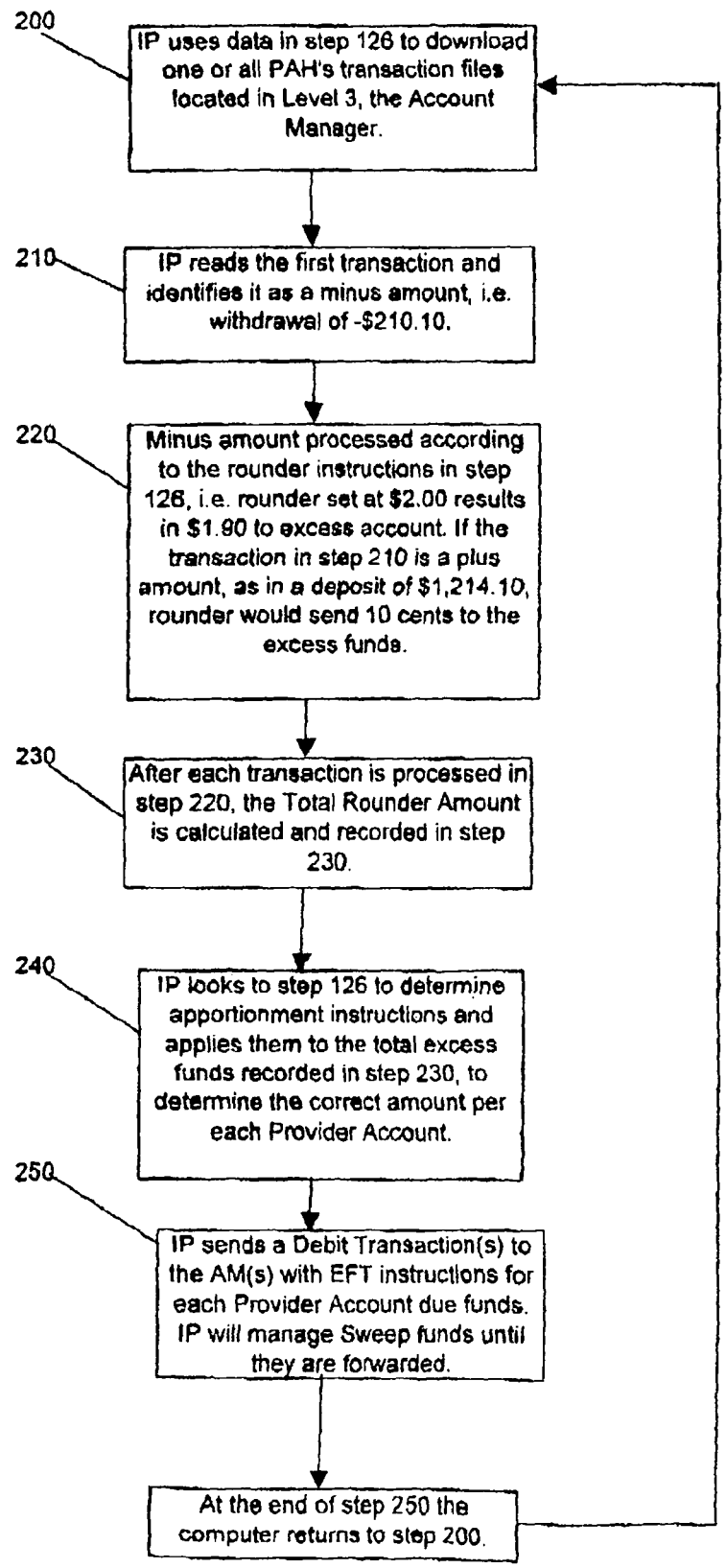
FIG. 3 is a flow chart of the data processing methodology for checking accounts used in the terminals and processing computers operated by Level 4 in FIG. 1.

Referring now to FIG. 3, there is a flow chart, which illustrates the steps, which the Information Processor IP takes to independently round up a Payer Account Holder's checking account and/or other accounts held and managed by Account Manager(s).

Beginning at the top of FIG. 3, in step 200, the Information Processor IP first uses the Payer Account Holder PAH's Account Instructions AI with the authorization to retrieve or receive a Transaction File (TF), a download of a monthly (or any time frame or period) checking account statement, from the Account Manager(s) selected by the Payer Account Holder PAH. The Transaction File TF can be composed of check drafts, ATM withdrawals, POS debit withdrawals, checking account fees, interest payments, and account deposits etc.

In step 210 the Information Processor IP reads the first transaction and identifies it as minus or negative amount of $210.10. (i.e. a withdrawal)

In step 220 the negative amount in step 210 is processed according to the Account Instructions AI entered in step 126, i.e. rounder set at $2.00 results in a $1.90 in excess fluids.

If in step 210 the transaction was a plus amount, as in a deposit of $1,214.10, the rounder instructions would send the 10 cents into the excess amount.

For each transaction in the Transaction File, the Information Processor IP would apply the rounder instructions until all transactions are processed.

In step 230 the total of excess funds will be reported after each transaction is processed. When all transactions are processed the Total Rounder Amount (TRA) will be determined and recorded in the Information Processor IP's central computer.

In step 240 the Information Processor IP looks in step 126 to determine the Provider Accounts and the Apportionment Instructions selected by the Payer Account Holder PAH. As the Information Processor IP applies the Payer Account Holder PAH's apportionment instructions against the Total Rounder Amount, the specific amounts due each PA are established.

In step 240 if the funds due a specific Provider Account is less than the critical mass required by the Provider Account, the funds will be maintained in the Sweep Account (SA) managed by the Information Processor IP.

In step 250 the Information Processor IP sends a Debit Transaction(s) (DT) to the Account Manager AM using the stored EFT information on each Provider Account PA that is due funds. The Information Processor IP withdraws the amounts needed.

At the end of step 250 the computer returns to step 200.

Figure 4:
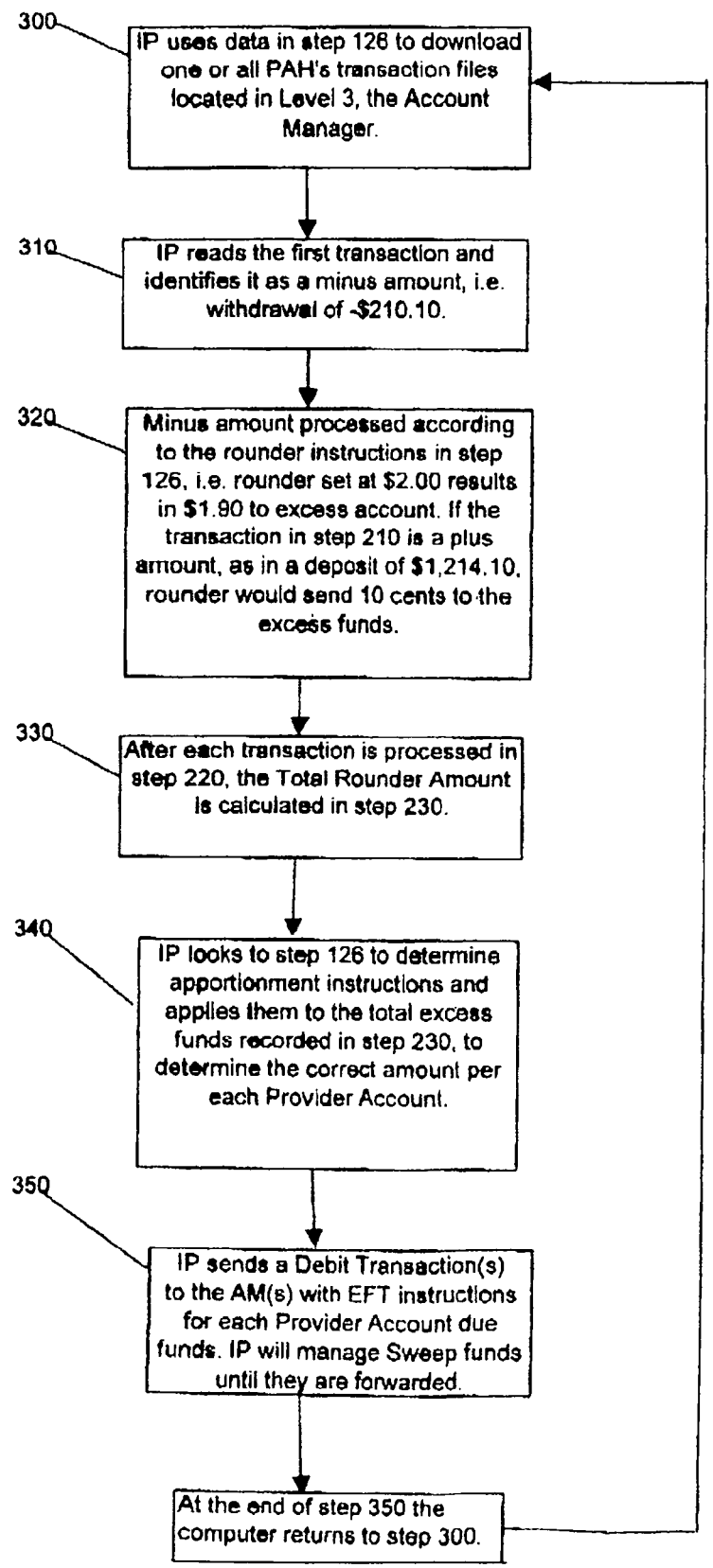
FIG. 4 is a flow chart of the data processing methodology for credit, debit, smart card account(s) used in the terminals and processing computers operated by Level 4 in FIG. 1.

Beginning at the top of FIG. 4, in step 300, the Information Processor IP first uses the Payer Account Holder PAH's Account Instructions AI with the authorizations to retrieve (through an independent source or any available method such as OFX) or receive a Transaction File (TF), a download of a monthly (or any time frame) credit/debit account statement from the Account Managers selected by the Payer Account Holder PAH. The transactions can be a credit, debit, smart card charges, cash advances, credit from returned merchandise, account payments, etc.

In step 310 the Information Processor IP reads the first transaction and identifies it as minus or negative amount of $210.10. (i.e. a credit card charge or cash advance.)

In step 320 the minus or negative amount in step 310 is processed according to the Account Instructions AI entered in step 126, i.e. rounder set at $1.00 results in a $0.90 in excess funds.

If step 310 were a plus amount as in an account payment of $1,214.10, in step 320 the rounder instructions would send the 10 cents into the excess amount.

For each transaction in the Transaction File, the Information Processor IP would apply the rounder instructions until all transactions are processed.

In step 330 the total of excess funds will be reported after each transaction is processed. After all transactions are processed the Total Rounder Amount (TRA) is then calculated.

In step 340 the Information Processor IP looks in step 126 to determine the Provider Accounts and the Apportionment Instructions selected by the Payer Account Holder PAH. As the Information Processor IP applies the Payer Account Holder PAH's apportionment instructions against the Total Rounder Amount, the specific amounts due each PA are established.

In step 340 if the funds due a specific Provider Account is less than the critical mass required by the Provider Account, the funds will be maintained in the Sweep Account (SA) managed by the Information Processor IP.

In step 350 the Information Processor IP sends a Debit Transaction (DT) to the Account Manager AM using the stored EFT information on each PA that is due funds. The funds are withdrawn from the Account Manager AM.

At the end of step 350 the computer returns to step 300.

In other embodiments of the invention the following can occur:

At Level 1 the Payer Account Holder PAH may fax or e-mail a hard copy of his/her/its monthly check, credit, debit, and/or smart card statement directly to Level 4 for processing.

At Level 5 the PA may fax or e-mail a hard copy of his/her/its supporters or clients and his/her/its Account Instructions AI directly to Level 4 the Information Processor IP for storage and future processing.

Information Processor IP, Level 4, functions can also be performed at Level 1, in the Payer Account Holder PAH's personal computer (PC) which sends information through a Remote Input directly to the Account Manager AM. Here the Payer Account Holder PAH initially downloads the Rounder Module (RM), which is a software program that creates the desired Debit Transaction in the Payer Account Holder PAH's computer and executes the desired Debit Transaction at the Account Manager AM. Under such an arrangement, the Payer Account Holder PAH will not need to send sensitive information online regarding his/her/its Account Instructions AI to a third party at Level 4.

In this embodiment, the Remote Module will perform all the functions of Level 4: computing the rounder per each transaction or based on a applying a multiplier to the number of transactions, totaling the excess funds, withdrawing the funds, and sending a debit to the Account Manager AM in the name of the selected PA(s).

In a similar embodiment, Provider Accounts, located in Level 5, can also download (and use) the Rounder Module (RM) in his/her/its respective PC(s) to create the desired Debit Transaction and sends them to the Account Manager AM(s) for execution. Under such an arrangement, the PA(s) will not need to send sensitive information online regarding his/her/its Account Instructions AI to a third party at Level 4.

In an embodiment of the invention, creates excess funds from exact payments with or without the cooperation or even awareness of the Account Manager(s).

This independent rounding system create excess funds by applying a plus or minus (positive or negative) determinant to the face amount or number of account entries, e.g. deposits, checks, ATM withdrawals, and credit, debit, or smart card drafts.

The invention provides a unique and presently unavailable way for customers to save every time they spend, regardless of whether they use a check, ATM, or a credit, debit, or smart card.

The invention allows account holders to independently process his/her/its transactions with or without the approval or processing of his/her/its Account Manager(s).

Within the scope of the invention a consumer can initiate the rounding up or down of his/her/its traditionally processed transactions by instructing an information processor to perform the added processing service. The information processor may be the financial institution that manages the account, a service provider for the account manager, or an independent information processor not associated with the financial institution that provides the account.

In one specific aspect, the invention provides a method and system to create excess funds from consumer financial transactions that use checks, ATMs, and credit, debit, or smart cards.

According to an aspect of the invention, a consumer, who is a Payer account holder, registers with and instructs an information processor to perform added processing services to his/her/its account. The information processor would then download the transaction data from the Payer Account Holder PAH account.

According to another aspect of the invention, the information processor adds or subtracts a determinant to the face amount of the account transaction(s) or applies a multiplier to the number of transactions for the purpose of creating excess funds.

According to yet another aspect of the invention, the information processor creates and issues a draft equal to the amount of the excess funds against the customer's existing account(s) and forwards the funds to a provider account(s) selected by the customer, the Payer account holder.

The Remote Inputs RI allow the various elements in which they reside to communicate on-line. The terms withdrawing and debiting are used separately although the term debiting may be used to embrace both concepts.

According to an embodiment the data of the information processor IP is used periodically by the account manager AM to perform the rounding and debiting. That is, at periods, the account manager collects an aggregation of transactions and applies the roundup to them.

Figure 5:
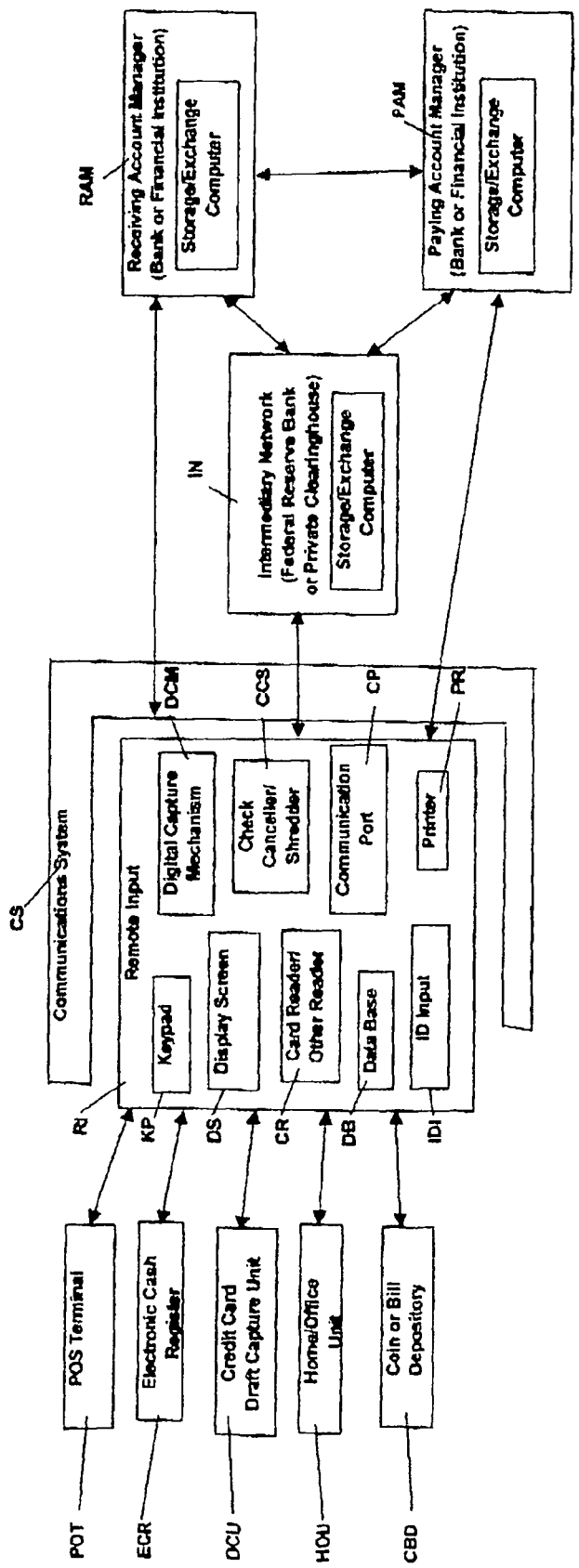
FIG. 5 is a block diagram of the depositing system embodying features of the invention.

The block design in FIG. 5, shows the hardware in a network, which an account holder may make deposits or payments of cash and/or checks to an account managed by a financial institution.

The system uses a remote input RI that may be operated alone or the RI may be attached to an additional unit AU such as a point of sale terminal POST, electronic cash register ECR, credit card draft capture unit DCU, a home/office personal or business computer unit HOC, and/or a coin/bill depository CBD.

As indicated in the block design in FIG. 5, one of the embodiments of the system would have the remote input RI equipped with a keypad KP, a card reader CR (that may read a bar code, magnetic stripe, or a chip card), and any other inputs OI, (i.e. such as wireless input device WID, a voice activated input VAI), a display screen DS, a digital capture mechanism DCM, a check canceller/shredder CC/S, a printer PR, a coin/bill depository CBD, a communication port CP, and a data base DB.

Connecting the remote input RI and any additional unit AU to financial networks will be a communication system CS that may include telephone lines, wireless telephone connections, satellites, or cable connections.

The functions provided by the remote input RI will include, but will not be limited to, (1) recording and forwarding account information on account holders who are making deposits and payments, (2) recording and forwarding account information on the business or personal accounts used by agents to facilitate the transfer of cash provided by account holders AH for deposit or payment, (3) accepting, storing, and counting of bills and coins for deposit, (4) recording and forwarding information corresponding to the amount of cash and/or checks being deposited, (5) performing scanning and imaging services to create and forward digital images of both sides of paper checks, (6) after forwarding digitized information on the checks to financial networks, recording and storing acknowledgements back from the bank networks that the critical information has been properly stored, and (7) carrying out the instructions from the bank networks to stamp cancel or shred the physical checks used in the payment or deposit transaction.

Throughout this specification, the term x, when appended to the end of a reference character, is equal to 1, ... M, ... N.

In other embodiments of the invention, the RI and other computers in FIG. 5, could be operated in other configurations or designs.

Figure 6:
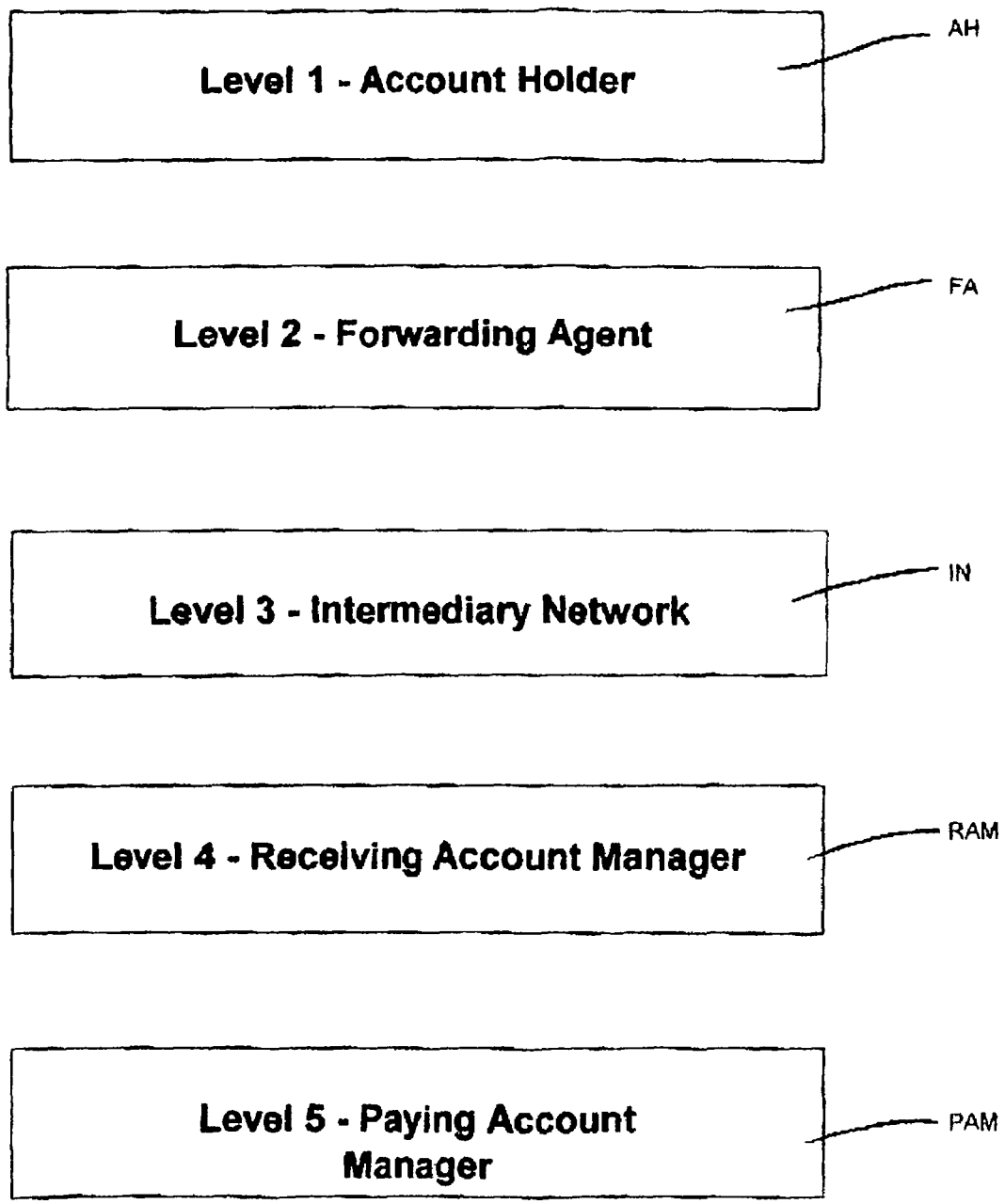
FIG. 6 is a block design of the parties involved in the depositing methodology shown in FIG. 5.

In FIG. 6, shows an embodiment of the invention that includes a five level system.

The first level involves an Account Holder AH, who may be any type of financial transactor such as a person, institution, governmental entity, trust, corporation, or a customer, and who may hold one or more accounts of any kind such as a checking, credit, debit, home equity, or smart card accounts.

It is the goal of the Account Holder AH to use the invention to make a payment or deposit to a financial institution that holds their account.

The second level involves Forwarding Agents FA who operate the remote input RI units used to collect, process, and forward deposits or payments (in the form of cash and/or check) to the financial institutions selected by the Account Holders.

Said Forwarding Agent FA may be third party entities such as supermarkets owners, retail merchants, governmental agencies, i.e. U.S. Post Office, owners of stand alone commercial coin/bill counting machines, etc.

According to an embodiment of the invention when a cardholder tenders cash in the form of coins and/or bills to a third party agent, the third party accepts the cash and makes deposits to their business or personal account. Under such an arrangement, the Agent's bank will then ACH transfer the cash deposits to the financial institution that the Account Holder AH selected for the deposit or payment.

Commonly, the third party entity that accepts the Account Holder's AH cash will have previously entered into a trust relationship with the financial institutions that will eventually receive the funds. This type of fiduciary arrangement is presently in place when merchants act as agents for financial institutions that provide money transmitters services (money orders and money grams) for consumers at point of sale locations.

According to another embodiment, when checks are provided by the Account Holders AH for deposit or payment the following will take place:

(1) Agents will enter each check, one at time, into a scanner or reader so that both sides of the check are digitized. Each individual check will stay in the remote unit until it receives final instructions from one of the financial networks.

(2) Once an individual check is digitized, the remote input RI unit will forward the images to the financial networks for storage and acknowledgement.

(3) Once the images are successfully secured in the financial network, the receiving and storing computer will send an acknowledgement back to the remote input RI along with computer instructions (that could be mandatory) to stamp cancel or shred the check that is being held inside the RI.

(4) The RI will then stamp cancel or shred the check and if available similarly process the next check.

(5) After the RI processes all checks and/or cash, the RI will provide a receipt showing the details behind the transaction.

When operators of coin and/or bill accepting machines act as Forwarding Agents FA, they will follow the same procedures and assume the same responsibilities as other point of sale merchants.

As an alternative embodiment to the third party Forwarding Agent FA operating the RI, may be the Account Holder him or herself. The AH may perform the Agent's role by entering deposit or payment data into a personal or business computer, Internet appliance, a modified fax machine, etc. Under such an arrangement the deposits or payments will only be in the form of checks.

The third level involves an Intermediary Network IN that would be the Federal Reserve Bank or a privately operated bank clearinghouse. The Intermediary Network IN receives the initial depositing and payment information acting as the first bank of deposit. Under such an arrangement, multiple remote input RIx units operating within level 2, will make deposits or payments to the Intermediary Network IN.

Once level 3 accepts and stores the information from the Forwarding Agent FA, level 3 will send an acknowledgement back to level 2 along with computer instructions to stamp cancel or shred a check being held within the RI unit The fourth level is the Receiving Account Manager RAM, a financial institution that holds the checking, credit, debit, home equity, or smart card accounts of the Account Holder AH.

In order to allow the completion of the deposit or payment to level 4, level 3 will forward all the needed information required by level 4.

The fifth level is the Paying Account Manager PAM, a financial institution that makes payments when required to a Receiving Account Manager RAM.

In order to make funds transfer from level 5 to level 4, level 3 will also forward all the needed information required to level 5. Level 5 as the paying account manager will also make all final debits to the accounts that it manages.

According to another embodiment the remote input RI could skip sending its deposit or payment data to level 3 and report the data and complete the depositing or payment process directly with level 4 or 5. Under such circumstances, level 4 would send the data to 5 or level 5 would send the data to level 4 to complete the transaction process.

Figure 7:
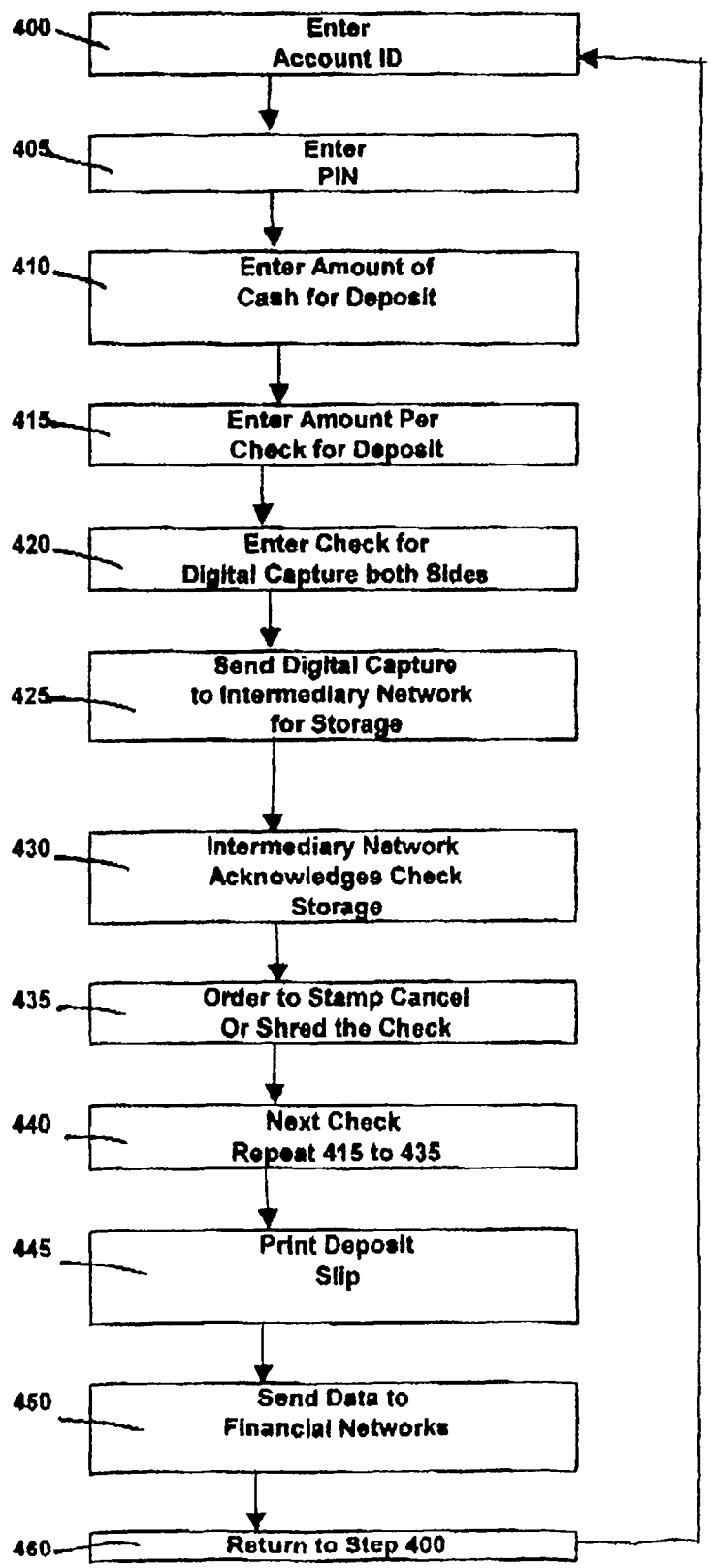
FIG. 7 is a flow of the data processing methodology for making deposits to a checking or savings account chart that occurs in FIG. 5.

FIG. 7, is a flow chart which illustrates the steps in a computer which takes place in FIG. 5, when an Account Holder AH, makes a deposit or payment into a remote input RIx.

In step 400, software in the RI tells the Account Holder AH (or a clerk) to enter in their ID and account information by key stroking in an account number or using a magnetic stripe, bar coded, or chip card. At this point the software may also require a biometric scan such as an Iris scan, voice activated, or other entry means.

In step 405, the RI instructs the AH to enter their PIN or password using any of the above methods.

In step 410, the RI requests the AH to enter in the amount of cash being deposited, if any.

In step 415, the RI requests the AH to enter the face amount of a check being deposited.

In step 420, the RI instructs the AH to enter the check into the digital capture mechanism DCM. Once inserted into the DCM, the check is scanned on both sides. The digital image of the front of the check captures the amount of the check, the signature of the payor, the bank routing number of the issuing bank, the payee's name on the check, the date, and any added notes. The digital image of the back of the check shows the signatures of any endorsers.

In step 420 the check stays in the DCM for stamp canceling or shredding, if approved, at step 435.

In step 425, the scanned images are sent to an off site to a Intermediary Network IN at level 3 or to the Receiving Account Manager RAM at level 4 or to the Paying Account Manager PAM at level 5 using the remote input's RI's communication capabilities CS.

In step 430, the remote input RI receives an acknowledgment message from the IN, RAM, or PAM that both scanned images are safe and secure in a financial institution's computer network. Once secured in the financial network computers, the digitized check images will be available to verify signatures, show proof of deposit, show the paying bank, and provide a canceled check record for the checking account customer.

In step 435, once the remote input RI receives acknowledgement that the images are safely stored, the check still being held in the DCM at step 420 is stamped cancelled or shredded.

If additional checks are being deposited, in step 440, the RI instructs the AH to repeat steps 415 through 435 for each check being deposited.

In step 445, the remote input RI prints a deposit slip that shows the amount of cash deposited in the RI, the check(s) being deposited, the identification of the depositor, the time and date, the amount in all checks, reference numbers of the stored check images, the bank routing number on the payor's check, and the ID of the RIx.

In step 450, the RI sends a digitized information packet that contains the details in step 445 plus the merchant's checking account information MCA to the Intermediary Network IN, Receiving Account Manager RAM, and/or the Paying Account Manager PAM. In step 450, the order of communications to the various parties can vary based upon the individual needs of any one financial institution.

At step 460, the RI returns to step 400.

Figure 8:
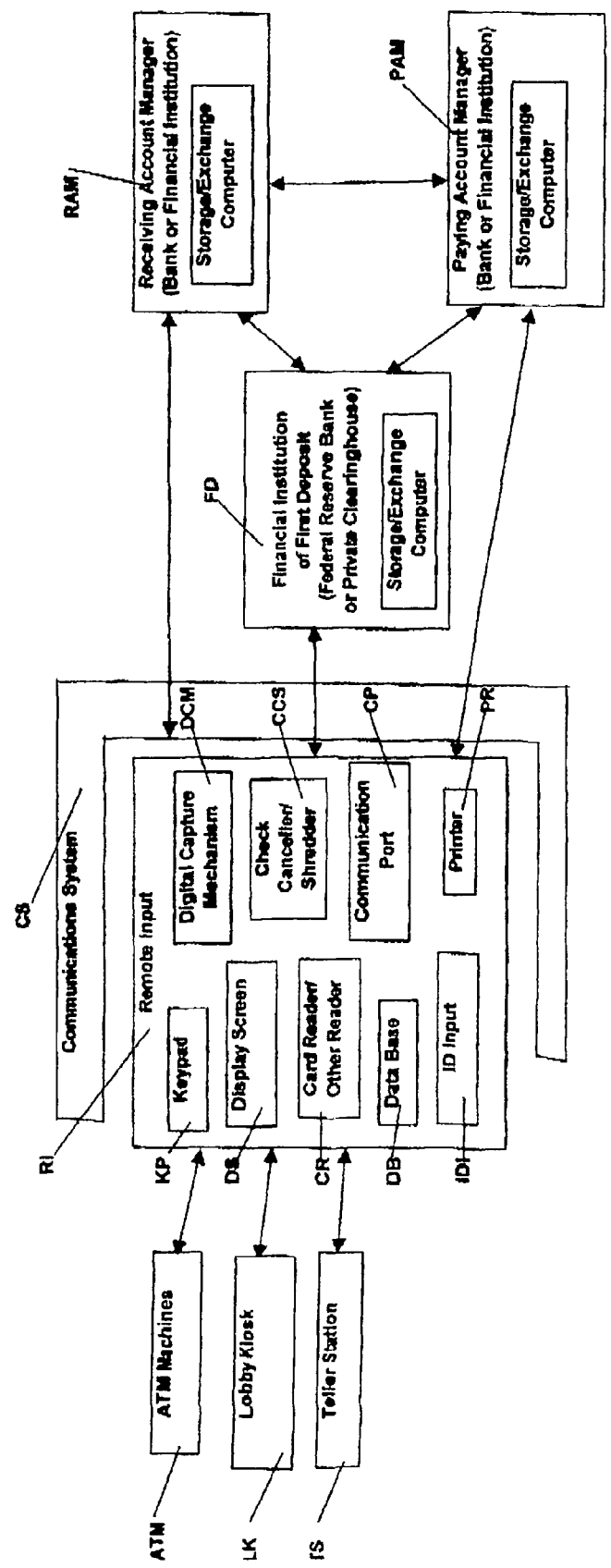
FIG. 8 is a block diagram of the depositing system embodying features of the invention.

The block design in FIG. 8, shows the hardware in a network, which an account holder may make deposits or payments of cash and/or checks to an account managed by a financial institution.

The system uses a remote input RI that may be operated alone or the RI may be attached to an additional unit AU such as an ATM machine, a lobby kiosk, or a PC or other computer operated by a teller or financial services representative.

As indicated in the block design in FIG. 8, one of the embodiments of the system would have the remote input RI equipped with a keypad KP, a card reader CR (that may read a bar code, magnetic stripe, or a chip card), and any other inputs OI, (i.e. such as wireless input device WID, a voice activated input VAI), a display screen DS, a digital capture mechanism DCM, a check canceller/shredder CC/S, a printer PR, a coin/bill depository CBD, a communication port CP, and a data base DB.

Connecting the remote input RI and any additional unit AU to financial networks will be a communication system CS that may include telephone lines, wireless telephone connections, satellites, or cable connections.

The functions provided by the remote input RI will include, but will not be limited to, (1) recording and forwarding account information on account holders who are making deposits and payments, (2) accepting, storing, and counting of bills and coins for deposit, (4) recording and forwarding information corresponding to the amount of cash and/or checks being deposited, (5) performing scanning and imaging services to create and forward digital images of both sides of paper checks, (6) after forwarding digitized information on the checks to financial networks, recording and storing acknowledgements back from the financial networks that the critical information has been properly stored, and (7) carrying out the instructions from the bank networks to stamp cancel or shred the physical checks used in the payment or deposit transaction.

Throughout this specification, the term x, when appended to the end of a reference character, is equal to 1, ... M, ... N.

In other embodiments of the invention, the RI and other computers in FIG. 8, could be operated in other configurations or designs.

Figure 9:
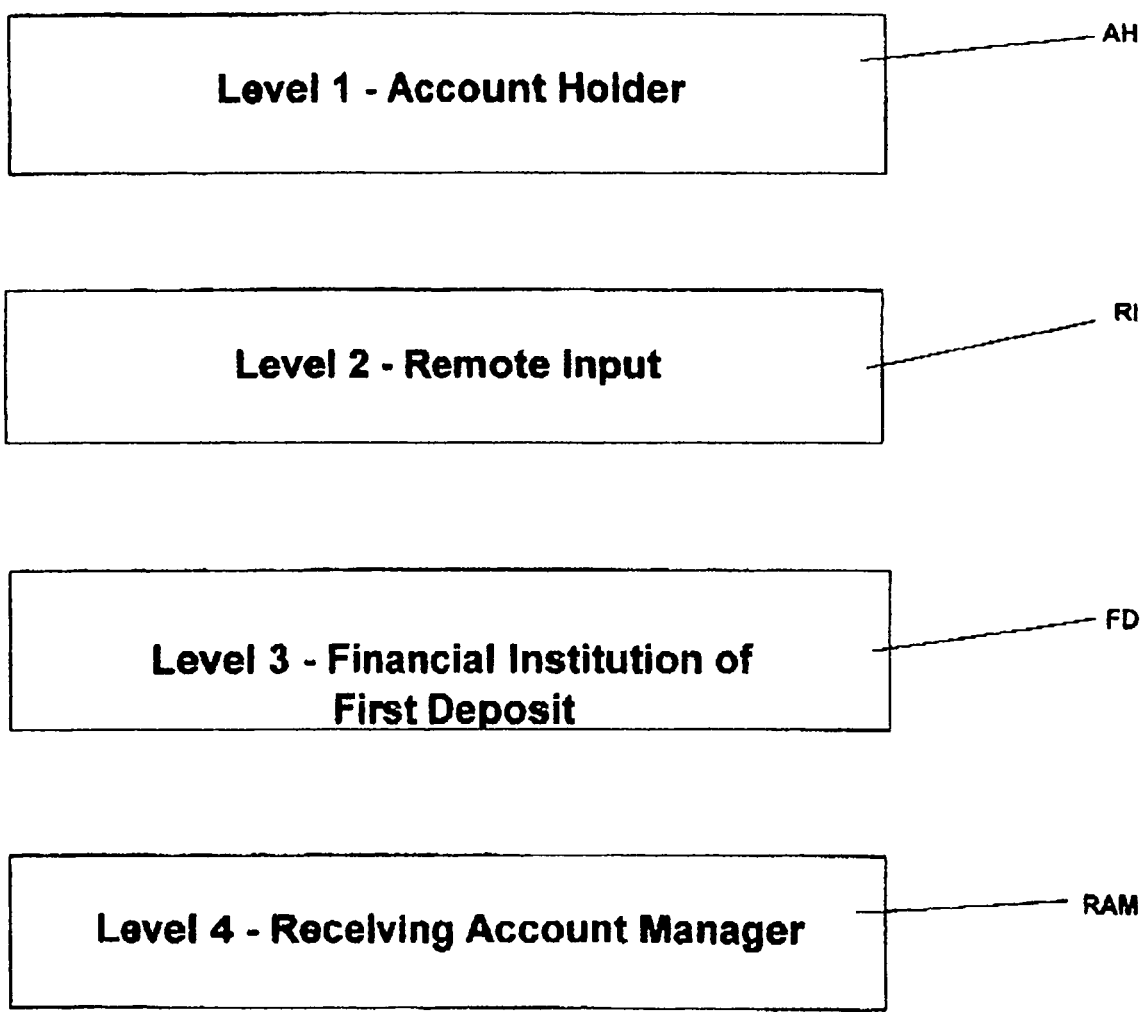
FIG. 9 is a block design of the parties involved in the depositing methodology shown in FIG. 8.

In FIG. 9, shows an embodiment of the invention that includes a five level system.

The first level involves an Account Holder AH, who may be any type of financial transactor such as a person, institution, governmental entity, trust, corporation, or a customer, and who may hold one or more accounts of any kind such as a checking, credit, debit, home equity, or smart card accounts.

It is the goal of the Account Holder AH to use the invention to make a payment or deposit to a financial institution that holds their account.

The second level involves the Remote Input RI units used to collect, process, and forward deposits or payments (in the form of cash and/or check) to the financial institutions selected by the Account Holders.

Said Remote Inputs RI are controlled by the financial networks that receive the deposits. They may be operated by employees of the financial networks or by Account Holders AH themselves. The Remote Input units may be located in the lobbies of the financial institutions, ATM machines, teller stations, and stand alone kiosks located in banks, supermarkets, retail merchant locations, governmental agencies, i.e. U.S. Post Office, etc.

According to another embodiment, when checks are entered into a Remote Inputs for deposit or payment the following will take place:

(1) Account Holders AC or employees of the financial networks will enter each check, one at time, into a scanner or reader so that both sides of the check are digitized. Each individual check will stay in the remote unit until it receives final instructions from one of the financial networks.

(2) Once an individual check is digitized, the remote input RI unit will forward the images to the financial networks for storage and acknowledgement.

(3) Once the images are successfully secured in the financial network, the receiving and storing computer will send an acknowledgement back to the remote input RI along with computer instructions (that could be mandatory) to stamp cancel or shred the check that is being held inside the RI.

(4) The RI will then stamp cancel or shred the check and if available similarly process the next check.

(5) After the RI processes all checks and/or cash, the RI will provide a receipt showing the details behind the transaction.

The third level involves the Financial Institution of First Deposit FD that could be the Account Holder's AH bank that manages its account, the Federal Reserve Bank, or a privately operated bank clearinghouse. The Financial Institution of First Deposit FD receives the initial depositing and payment information acting as the first bank of deposit. Under such an arrangement, multiple remote input RIx units operating within level 2, will make deposits or payments to the Financial Institution of First Deposit FD.

Once level 3 accepts and stores the information from the Remote Inputs RI, level 3 will send an acknowledgement back to level 2 along with computer instructions to stamp cancel or shred a check being held within the RI unit If level 3 is not the manager of the Account Holders AH account but instead it is a private or government owned clearinghouse, the fourth level is the Receiving Account Manager RAM, a financial institution that holds the checking, credit, debit, home equity, or smart card accounts of the Account Holder AH.

In order to allow the completion of the deposit or payment to level 4, level 3 will forward all the needed information required by level 4.

The fifth level is the Paying Account Manager PAM, a financial institution that makes payments when required to a Receiving Account Manager RAM.

In order to make funds transfer from level 5 to level 4, level 3 will also forward all the needed information required to level 5. Level 5 as the paying account manager will also make all final debits to the accounts that it manages.

According to another embodiment the remote input RI could skip sending its deposit or payment data to level 3 and report the data and complete the depositing or payment process directly with level 4 or 5. Under such circumstances, level 4 would send the data to 5 or level 5 would send the data to level 4 to complete the transaction process.

Figure 10:
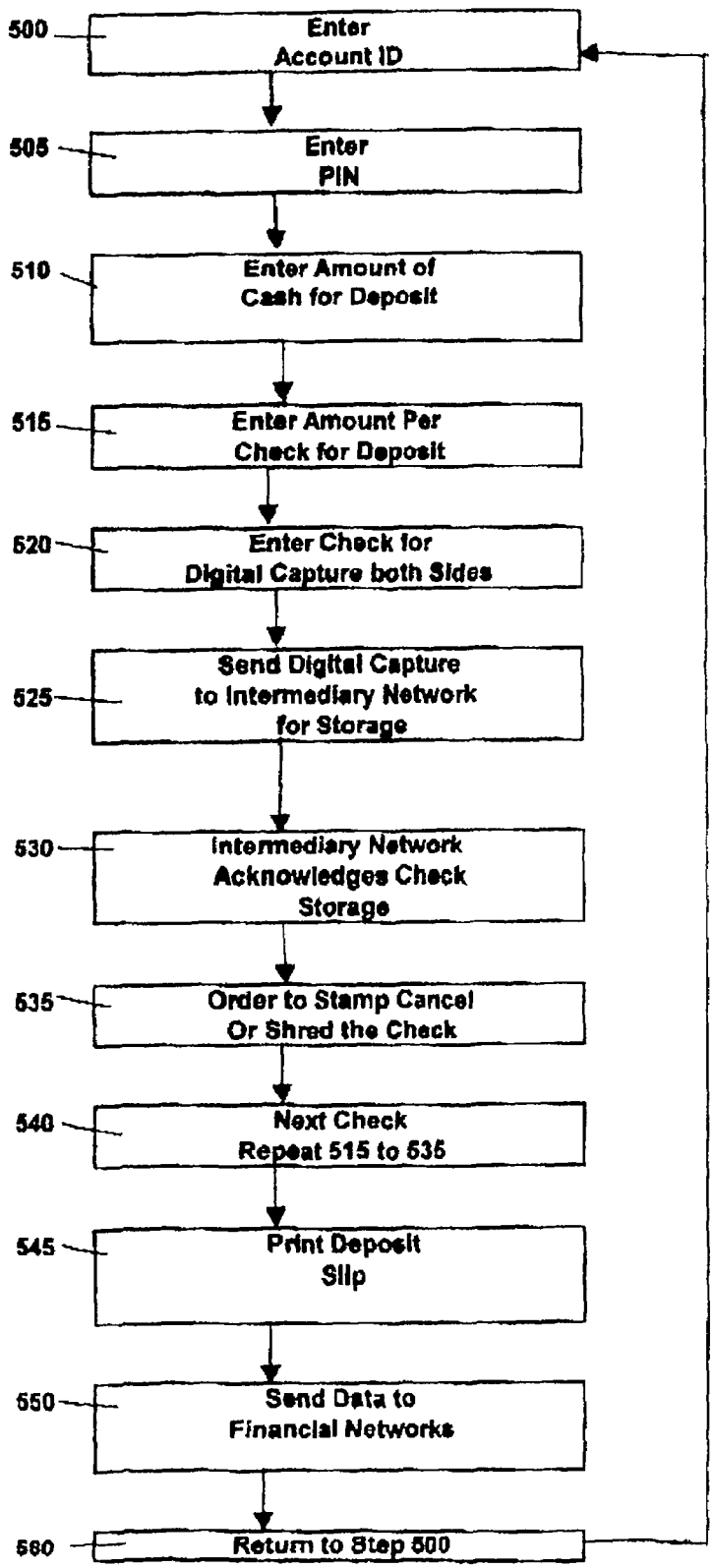
FIG. 10 is a flow of the data processing methodology for making deposits to a checking or savings account chart that occurs in FIG. 8.

FIG. 10, is a flow chart which illustrates the steps in a computer which takes place in FIG. 8, when an Account Holder AH makes a deposit or payment into a remote input RIx.

In step 500, software in the RI tells the Account Holder AH (or a clerk) to enter in their ID and account information by key stroking in an account number or using a magnetic stripe, bar coded, or chip card. At this point the software may also require a biometric scan such as an Iris scan, voice activated, or other entry means.

In step 505, the RI instructs the AH to enter their PIN or password using any of the above methods.

In step 510, the RI requests the AH to enter in the amount of cash being deposited, if any.

In step 515, the RI requests the AH to enter the face amount of a check being deposited.

In step 520, the RI instructs the AH to enter the check into the digital capture mechanism DCM. Once inserted into the DCM, the check is scanned on both sides. The digital image of the front of the check captures the amount of the check, the signature of the payor, the bank routing number of the issuing bank, the payee's name on the check, the date, and any added notes. The digital image of the back of the check shows the signatures of any endorsers.

In step 520 the check stays in the DCM for stamp canceling or shredding, if approved, at step 535.

In step 525, the scanned images are sent to an off site to a Financial Institution of First Deposit FD at level 3 or to the Receiving Account Manager RAM at level 4 or to the Paying Account Manager PAM at level 5 using the remote input's RI's communication capabilities CS.

In step 530, the remote input RI receives an acknowledgment message from the Financial Institution of First Deposit FD, Receiving Account Manager RAM, or Paying Account Manager PAM that both scanned images are safe and secure in a financial institution's computer network. Once secured in the financial network computers, the digitized check images will be available to verify signatures, show proof of deposit, show the paying bank, and provide a canceled check record for the checking account customer.

In step 535, once the remote input RI receives acknowledgement that the images are safely stored, the check still being held in the DCM at step 520 is stamped cancelled or shredded.

If additional checks are being deposited, in step 540, the RI instructs the AH to repeat steps 515 through 535 for each check being deposited.

In step 545, the remote input RI prints a deposit slip that shows the amount of cash deposited in the RI, the check(s) being deposited, the identification of the depositor, the time and date, the amount in all checks, reference numbers of the stored check images, the bank routing number on the payor's check, and the ID of the RIx.

In step 550, the RI sends a digitized information packet that contains the details in step 545, to the Financial Institution of First Deposit FD, the Receiving Account Manager RAM, and/or the Paying Account Manager PAM. In step 550, the order of communications to the various parties can vary based upon the individual needs of any one financial institution.

At step 560, the RI returns to step 500.

The number one advantage for the banking industry is that the invention liberates relevant information on deposits or payments to financial institutions from the physical restraints imposed by the transfer of paper checks and coins and bills.

By truncating checks at the initial time of deposit financial institutions will realize multiple ways to save both time and money. The imaging of both sides of a check, and sending the images off to safe storage, removes the need for the billions of physical checks to be transported, handled, and processed through by the ACH or the banks. Once digitized there are numerous financial savings, as well as the fact that the clearing and posting process will be accomplished in a shorter time.

In regard to Account Holders AH making deposits or payments using physical coins and bills at the point of sale or through a machine, this feature provide an additional break through resulting in the saving of additional time and money.

The invention's ability to extend and expand both merchant and home/office locations to include the capability of making deposits and payments, provides financial institutions with a wider scope and reach without requiring a major investment in capital spending. In fact the invention may enable financial institutions, such as banks, to close selected branch offices.

Consumers will also benefit because they will be able to go to supermarkets, convenience stores, etc. and simultaneously shop and bank, or make payments to other financial service providers while in a shopping location. This will save both time and money.

A special audience that will significantly benefit from the invention will be the Internet banking sector because now their customers can make deposits of cash and checks in millions of point of sale locations.

In addition customers will able to deposit checks to their accounts while never leaving their offices.

While embodiments of the invention have been described in detail, it will be evident to those skilled in the art that the invention may be embodied otherwise without departing from its spirit and scope. Therefore, the following claims are meant to encompass all alternatives and modifications within the scope and spirit of the present invention.

What is claimed is:

1. A method of accumulating credits from financial movements to and from an account held by a financial transactor and managed by an account manager, comprising:
   initiating roundup by accessing entries in the account with an information processor authorizing, by the transactor, rounding up of entries in the account;
   rounding up the entries in the account to obtain a total roundup amount;
   withdrawing the roundup amount from the account and debiting the account with the roundup amount;
   wherein the step of initiating roundup is performed by said information processor accessing the account in the account manager, and the steps of initiating, rounding up, and withdrawal are done outside the control of the account manager.

2. A method as in claim 1, wherein the step of withdrawing includes crediting the withdrawn amount to a provider account that the transactor authorizes the processor to credit.

3. A method as in claim 1, wherein the step of initiating includes obtaining instructions as to the account to be accessed and a manner of determining the rounding.

4. A method as in claim 1, wherein the step of initiating includes obtaining instructions as to the account to be accessed and a manner of determining an identity of the provider account.

5. A method as in claim 2, wherein the crediting step includes crediting the amount to a plurality of provider accounts authorized by the transactor.

6. A method as in claim 1, wherein the transactor includes one of a person, institution, governmental entity, trust, corporation, or a customer, and said transactor holds one or more accounts including checking, credit, debit, home equity, or smart card accounts.

7. A method as in claim 1, wherein the steps of accessing and rounding are performed by said information processor and said information processor is a service organization.

8. A method as in claim 1, wherein the steps of accessing and rounding are performed by said information processor and said information processor and said information processor resides as a module in a computer.

9. A system for independently accumulating credits from a customer account belonging to the customer and managed by an institution and placing the credits into a provider account, comprising:

an information processor; said information processor including a data store with data identifying the customer, the managed institution, and the account;

said data store including data authorizing the processor to access and read the customer account;

said data store including data to calculate roundups from the read customer account and to calculate an excess based on the roundups;

said data store including data to withdraw the excess from the customer account;

said data store including data to transfer the withdrawn excess to the provider account; and said information processor is external to and outside the control of the institution.

10. A system as in claim 9, wherein said information processor includes a communicator coupled to a communication network connected to the customer, the institution, and the account.

11. A system as in claim 9, wherein said data store includes data from a plurality of customers, a plurality of institutions, and a plurality of accounts.

12. A system as in claim 9, wherein said information processor is a service organization for handling data from a number of customers, institutions, and accounts.

* * * * *